United States Patent
Fries et al.

(10) Patent No.: US 7,036,023 B2
(45) Date of Patent: Apr. 25, 2006

(54) SYSTEMS AND METHODS FOR DETECTING TAMPERING OF A COMPUTER SYSTEM BY CALCULATING A BOOT SIGNATURE

(75) Inventors: Robert M. Fries, Redmond, WA (US); Michael K. Fleming, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 09/765,942

(22) Filed: Jan. 19, 2001
(Under 37 CFR 1.47)

(65) Prior Publication Data
US 2002/0099949 A1 Jul. 25, 2002

(51) Int. Cl.
*G06F 15/177* (2006.01)
*G06F 11/30* (2006.01)
*G06F 12/14* (2006.01)

(52) U.S. Cl. .................... 713/200; 713/2; 713/193
(58) Field of Classification Search ................ 713/200
See application file for complete search history.

(56) References Cited

U.S. PATENT DOCUMENTS

| | | | | |
|---|---|---|---|---|
| 5,935,249 A | * | 8/1999 | Stern et al. ................. 713/201 |
| 6,026,293 A | * | 2/2000 | Osborn ....................... 455/411 |
| 6,141,530 A | * | 10/2000 | Rabowsky ................... 725/116 |
| 6,401,208 B1 | * | 6/2002 | Davis et al. ................. 713/193 |
| 6,625,730 B1 | * | 9/2003 | Angelo et al. ................. 713/2 |

* cited by examiner

*Primary Examiner*—Ayaz Sheikh
*Assistant Examiner*—Brandon Hoffman
(74) *Attorney, Agent, or Firm*—Workman Nydegger

(57) ABSTRACT

A computer system that contains a boot signature checker is disclosed. In one example, the boot signature checker monitors the bus connecting the processor with the memory and provides a boot signature that is a function of the signal sequence detected on the bus. If an unauthorized user tampers with the operating system within the memory as when attempting to gain unauthorized access to presentable content such as television programming, the boot signature checker will in all probability produce a different boot signature than expected. The decrypter will respond to this different boot signature by, for example, deactivating thereby potentially preventing an unauthorized user from gaining access to presentable content.

30 Claims, 3 Drawing Sheets

SYSTEMS AND METHODS FOR DETECTING TAMPERING OF A COMPUTER SYSTEM BY CALCULATING A BOOT SIGNATURE

BACKGROUND OF THE INVENTION

1. The Field of the Invention

The present invention relates to the field of electronic communication. In particular, the present invention relates to systems and methods for detecting tampering of a computer system by calculating a boot signature, the boot signature being calculated using a sequence of signals generated during boot time within the computer system.

2. The Prior State of the Art

Electronic information is currently available in a variety of forms. Electronic information that is designed for presentation to a user will typically be in a form such that it may be rendered on a user interface device. For example, electronic information such as video, image, text, font and layout data may be displayed on a monitor thereby engaging a user's sense of sight. Electronic information such as audio may be sounded with a speaker thereby engaging a user's sense of hearing. In the future, with the development of appropriate user interface devices and standards, electronic information may represent data that would engage a user's sense of touch, taste, and smell as well. Electronic information that is designed for presentation to a user will be referred to in this description and in the claims as "presentable content" regardless of the format of the presentable content and regardless of whether standards and user interface devices for the presentable content are currently developed.

There may be many sources of presentable content. Remote sources might include, for example, radio broadcasters, television broadcasters, and server computer systems. Local source might include, for example, a local memory or a local server computer system. These sources will be referred to in this description and in the claims as "content sources" regardless of the particular source of the presentable content and regardless of whether the source is remote or local.

It may often be desirable to limit access to presentable content. For example, a television broadcaster may design that access to their channel be limited to only those users who have properly subscribed to that channel. A television broadcaster may also allow access on a program-by-program basis as in pay-per-view television. A content source such as a Web page provider may also desire to limit access to premium Web pages upon the payment of certain consideration. In these cases, the content source may typically encrypt the presentable content before transmission to the user. A content source such as a broadcast network or even a local memory device may store the presentable content in an already encrypted state thereby foregoing the need to encrypt the content again.

In order for an authorized user to be able to access encrypted presentable content on a user interface device, the corresponding system associated with the user interface device must have access to a service that determines that the user is authorized, and that decrypts the encrypted presentable content when it determines that the user is authorized. A set top box or a component integrated with a television monitor may be suitable devices for performing such a service for encrypted television programming. Devices that perform this service will be referred to in this description and in the claims as a "conditional access device."

Conventional conditional access devices typically include a decrypter that has access to encrypted presentable content requested by a user. For example, in television broadcasting, a user may control a tuner which tunes to one of the many channels that the conditional access device receives. The tuned channel is then demodulated and presented to the decrypter.

The decrypter is designed to respond to an appropriate key word or other authenticating string. Typically, unless provided with the key word, decrypters will either not pass any signal through to the user interface devices or will pass only the encrypted content through to the user interface devices. In either case, the user does not have access to the presentable content. However, once the appropriate key word is provided to the decrypter, the decrypter is activated so as to decrypt the encrypted presentable content and pass the presentable content to the user interface devices for presentation to the user. The decrypter is active indefinitely or until the happening of a certain event. Such events may include the receipt of another key word that deactivates the decrypter, the end of a certain presentable content segment, or the passage of a specified period of time.

There are a variety of ways that the key word can be provided to the decrypter when the user is authorized. For example, in the Digital Video Broadcast (DVB) standard, an Entitlement Control Message (ECM) is provided "in band" within the digital video broadcast. "In band" means in the same channel or frequency spectrum as the corresponding presentable content. The entitlement control message is processed by the local Central Processing Unit (CPU). If the entitlement control message indicates authority to access the digital video broadcast, the CPU causes a control word to be sent to the decrypter. This control word may be the key word that activates the decrypter or may be a word that enables the decrypter to load the key word from memory.

It may be possible to tamper with the content of local memory in order to obtain access to a presentable content segment even though the user is not so authorized. Typically, this might involve altering the operating system so that the key word is always provided to the decrypter even if the user is not authorized. This frustrates the purpose for providing a conditional access provider and allows access to presentable content under inappropriate circumstances. Therefore, what are desired are systems and methods for preventing users from tampering with computer systems so as to, for example, gain unauthorized access to presentable content.

SUMMARY OF THE INVENTION

The present invention relates to systems and methods for detecting tampering of a computer system by using boot signatures. A "boot signature" is a signal sequence and/or data structure that represents a value that is a function of the signal sequence detected internal to the computer system, during booting up of the computer system. For example, the signal sequence might be the series of states of the signal that comprise the bus that connects the system's processing device with the system's memory device. If the content of the memory device is altered, then the signal sequence detected on the bus will change. This will result in the production of a different boot signature than what would be expected if the computer system was not tampered with. Thus, the computer system can determine whether the computer system has been tampered with as when one is trying to gain unauthorized access to presentable content.

The present invention may be integrated within a conditional access device that conditions access to certain presentable content such as television and Internet programming upon the satisfaction of certain conditions such as subscribing to the presentable content. A suitable conditional access provider that may implement the present invention may include a processing device and a memory device with a bus connecting the processing device and the memory device. A decrypter receives presentable content and decrypts the presentable content depending on whether the user has rights to the presentable content. If the user has rights, then the decrypter is typically provided with a key word or string that activates the decrypter so that the decrypter is permitted to decrypt presentable content.

It may be possible to alter the memory within the memory device so as to be able to gain access to presentable content even if the user is unauthorized. This might be done by making changes to the operating system so that the activation key word is always provided to the decrypter regardless of whether or not the user is authorized.

Unauthorized changing of the operating system within the memory device often results in the signal sequence on the bus changing from what might be expected if the operating system was not manipulated so as to allow unauthorized access. A boot signature checker is coupled to the local bus so as to be able to monitor the signal sequence on the bus during booting of the conditional access device. The boot signature checker then produces a boot signature that is a function of the signal sequence detected during boot time. The expected boot signature produced would be that produced when the signal sequence during boot time is normal indicating no tampering of the operating system to gain unauthorized access. If the actual boot signature is different than the expected boot signature, then the decrypter or other elements of the conditional access device are disabled so as to prevent the user does not gain unauthorized access to at least the tuned presentable content. In addition, the conditional access device might disable a network interface device such as a network interface device for a DOCSYS cable modem or a DSL connection device. The conditional access device may also disable a phone line ADSL modem, an analog modem and so forth.

If the actual boot signature is the expected boot signature, then there is no indication that the operating system has not been tampered with. Thus, the correct boot signature results in the key word being provided to the decrypter assuming all other conditions for access are satisfied.

An advantage of the present invention is that it makes it much more difficult for an unauthorized user to gain access to presentable content by tampering with the operating system since such tampering would result in the boot signature being different than expected. Thus, content sources can be more secure in providing presentable content to users.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both systems and methods for detecting tampering to a computer system by calculating boot signatures. The "boot signature" is a function of a signal sequence detected internal to the computer system during booting up of the computer system. For example, the signal sequence may be detected on the bus that connects the computer system's processing device with the computer system's memory device. If the memory device content, specifically the operating system stored on the memory device, or any other part of the computer system is altered so as to allow unauthorized access to presentable content, then the detected signal sequence will change. This will result in the calculation of a different boot signature than what would be expected if the computer system was not altered. Thus, the computer system can determine that the computer system has been tampered with to allow unauthorized access. Upon such detection, the computer system may take certain action to prevent such unauthorized access. For example, the computer system might disable any of the components of the computer system that, when disabled, prevents presentation of the presentable content. Such components might include, for example, a demodulator, a decrypter, a network interface device, a tuner, a CPU clock and the like.

The embodiments of the present invention may comprise a special purpose or general purpose computer including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
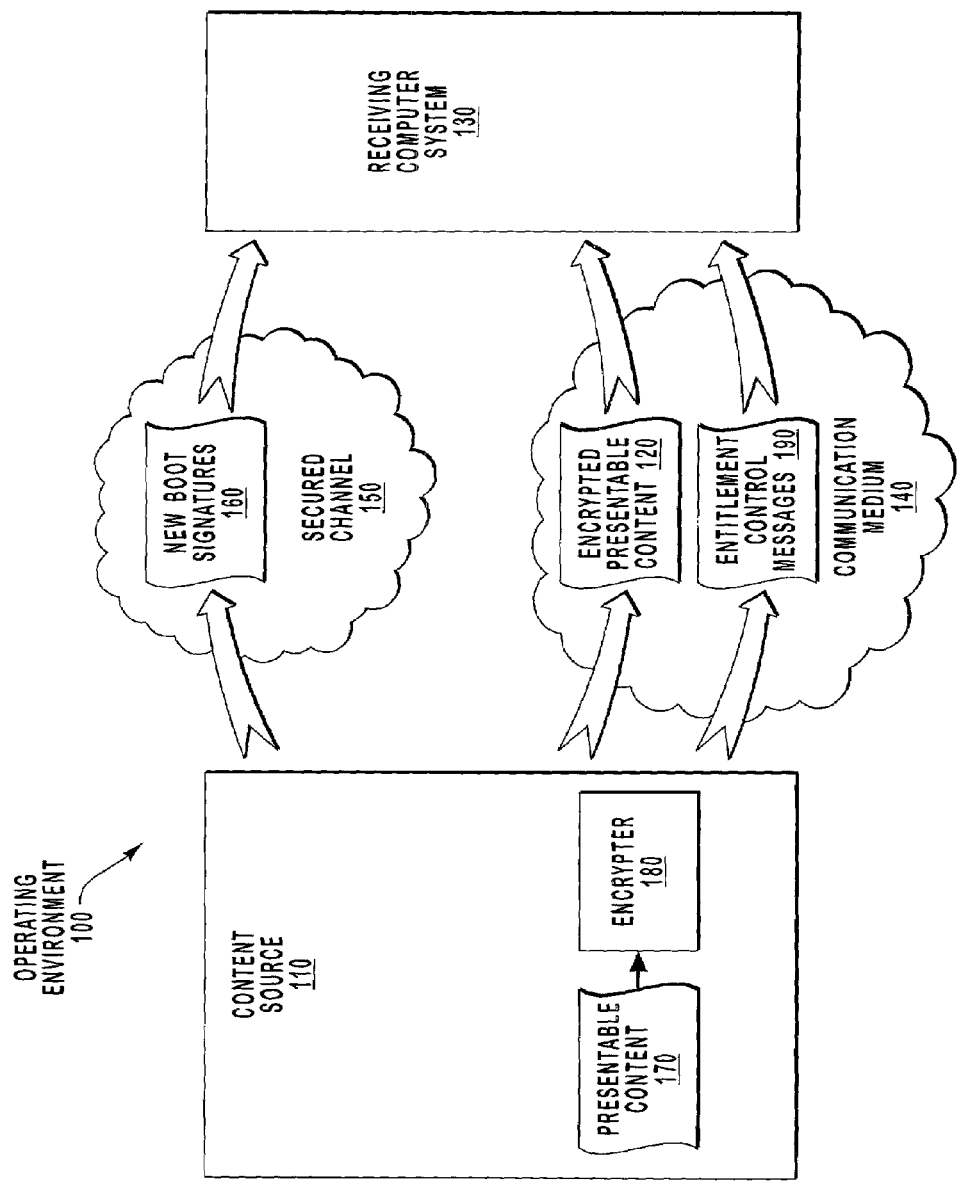
FIG. 1 illustrates an exemplary system that provides a suitable operating environment for the present invention.

FIG. 1 and the following discussion are intended to provide a brief, general description of a suitable environment in which the invention may be implemented. Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates a suitable operating environment 100 for the present invention. A content source 110 provides presentable content 120 to a receiver computer system 130 over a communication medium 140. The content source 110 may be any provider of presentable content including, but not limited to, a radio broadcaster, a television broadcaster, a remote server, a local server, or a local memory. The presentable content 120 may include, but is not limited to, radio broadcasting, television broadcasting, Web pages, stored video, stored audio, other stored data, and so forth. The communication medium 140 may be terrestrial airwaves, cable, satellite, the Internet, a local network, a local bus or any other medium capable of transporting presentable content to the conditional access device 130.

The operating environment 100 also includes a secured channel 150 for transmitting new boot signatures 160 to the receiver computer system 130. As will be explained in greater detail below, these new boot signatures 160 are transmitted to the receiver computer system when software in the receiver computer system is upgraded.

In a specific embodiment in which the content source 110 is a digital television source such as a digital television broadcaster, the content source 110 passes the presentable content 170 through an encrypter 180. The encrypted presentable content 120 is then transmitted to the receiver computer system along with Entitlement Control Messages ("ECMs") 190 which describe access privileges to the encrypted presentable content.

Figure 2:
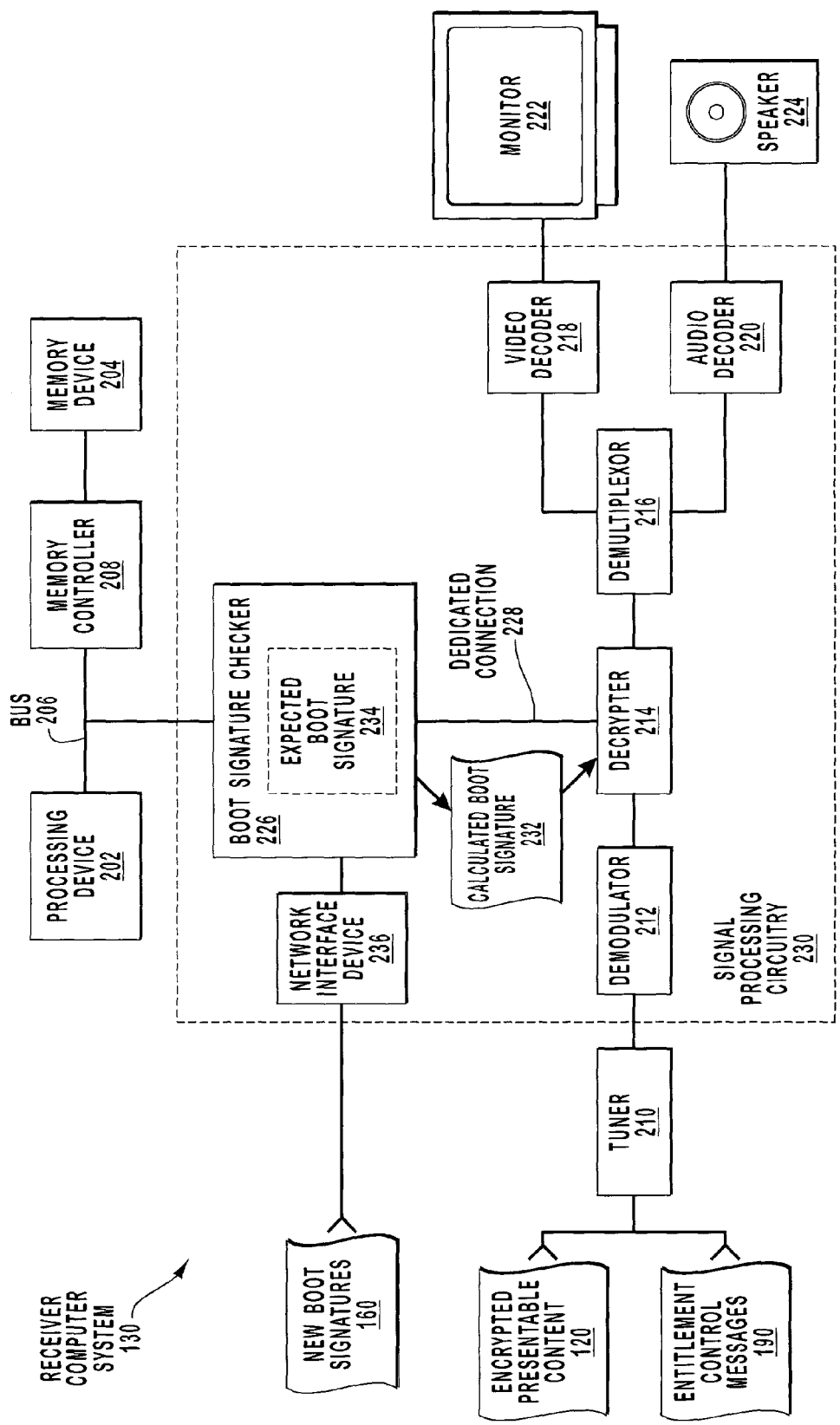
FIG. 2 illustrates a computer system such as a conditional access device implemented in the environment illustrated in FIG. 1 in accordance with an embodiment of the present invention.

FIG. 2 illustrates the receiver computer system 130 of FIG. 1 in further detail. In this particular example, the presentable content 120 received at the receiver computer system 130 will be described as being an encrypted digital television broadcast. However, the present invention is not limited to just encrypted digital television broadcasts but is broad enough to include all types of presentable content whether now existing or to be developed in the future and whether encrypted or not.

The receiver computer system 130 includes a processing device 202 and a memory device 204 that are communicatively coupled through a bus 206 and through a memory controller 208. The processing device 202 may be a central processing unit such as those commonly available in the marketplace. The processing device 202 processes computer-executable instructions so as to facilitate the methods described herein.

The memory device 204 may be any memory device such as a Random Access Memory (RAM), a Read-Only Memory (ROM), or an EEPROM. The memory device 204 stores at least some of the computer-executable instructions and data needed for the processing device 202 to start up or "boot" the receiving computer system 130 upon powering up of the receiver computer system. The memory device 204 may also optionally include other instructions and data as well.

The memory controller 208 interfaces with the memory device 204 and monitors the bus 206 for instructions that the memory controller 208 is to execute on the memory device 204. For example, the memory controller 208 may receive an instruction to read from a certain address in the memory device 204 and place the content of that address on the bus 206. The memory controller 208 may also receive an instruction to write certain content into a certain address in the memory device 204. The bus 206 may be any communications connection that allows the processing device 202 and the memory controller 208 to communicate.

The bus 206 is also coupled to various components in signal processing circuitry 230 so that the processing device 202 may control the signal processing circuitry 230. The signal processing circuitry 230 includes a demodulator 212 that is coupled to a tuner 210 so as to be able to demodulate any channel tuned by the tuner 210. The demodulator 212 may be configured to demodulate everything tuned by the tuner 210, or may be configured to demodulate only some of the channels tuned by the tuner 210 as instructed by the processing device 202 over the bus 206.

A decrypter 214 is coupled to the demodulator 212 so as to receive the demodulated signal from the demodulator 212. The decrypter 214 selectively decrypts encrypted signals and forwards the decrypted signal to a transport stream demultiplexor 216. Under normal operating conditions in which no tampering of the receiver computer system 130 has occurred, the entitlement control messages 190 would typically drive whether or not the decrypter 214 would decrypt the encrypted signals.

The demultiplexor 216 then extracts video data from the decrypted signal and forwards that video data to a video decoder 218. The demultiplexor 216 also extracts audio data from the decrypted signal and forwards that audio data to an audio decoder 220. The video decoder 218 drives a monitor 222 so that the monitor 222 displays the video represented by the video data. Likewise, the audio decoder 220 drivers a speaker 224 so that the speaker 224 sounds the audio represented by the audio data. All of the signal processing circuitry 230 such as the demodulator 212, the decrypter 214, the demultiplexor 216, the video decoder 218 and the audio decoder 220 are coupled to the processing device 202 through the bus 206.

As mentioned above, the present invention determines whether the receiving computer system 130 has been tampered with by using boot signatures. A "boot signature" is a signal sequence or a data structure that is a function of the signal sequence detected internal to the receiving computer system 130 during booting up of the receiving computer system 130. The signal sequence should be monitored at a point in the receiving computer system 130 at which there would be a change in the signal sequence if tampering occurred. For example, in FIG. 2, tampering of the operating system within the memory device 204 would typically cause the signal sequence provided on the bus 206 to be different than expected.

If the signal sequence is altered from that which is expected, the memory device 204 might have been altered or swapped out to obtain access to unauthorized presentable content. If the signal sequence is altered, the boot signature will also be different that what is expected. This may result in action being taken that is responsive to the receiving computer system 130 being tampered with. Such action might include, for example, disabling the presentation of the presentable content.

Therefore, embodiments within the scope of the present invention include a means for calculating a boot signature that is a function of a signal sequence experienced internal to the computer system during booting up of the receiving computer system 130. In FIG. 1, an example of this means for producing a boot signature is illustrated by boot signature checker 226.

The boot signature checker 226 may comprise one or more physical components or may be integrated in another physical component. In the preferred embodiment, the boot signature checker 226 is integrated within the same physical component as the decrypter 214 so as to improve the security of the authentication mechanism.

The boot signature checker 226 is coupled to a bus 206 so as to able to monitor the signal sequence experienced on the bus 206 during boot time. The boot signature checker 226 is configured to provide a calculated boot signature 232 to the decrypter that is a function of the detected signal sequence on the bus 206. The boot signature checker 226 is configured to calculate this boot signature such that if the boot signal sequence is different than expected, the resulting calculated boot signature will most likely be different than expected as well.

There are numerous conventional algorithms for calculating such a boot signature. Any algorithm which creates substantially unique keys given multiple inputs will suffice. The inputs to the algorithm would be sampled signal values detected on the bus. The characteristics of the algorithm should be such that any change to the content of the memory device 204 results in a new boot signature. Such boot signatures can be created using higher order polynomial algorithms with the sampled signal values being inputs to the algorithm. The higher order polynomial expressions may also use an identifier unique to the receiver computer system 130 as a seed input to further improve the security of the receiver computer system. The receiver computer system 130 uses the calculated boot signature to determine whether or not the receiver computer system 130 has been tampered with. Accordingly, embodiments within the scope of the present invention include means for determining whether the calculated boot signature is indicative of the receiver computer system being tampered with. Specifically, the boot signature checker 226 has access to an expected boot signature 234 that represents what the calculated boot signature should be if the receiver computer system 130 has not been tampered with. The boot signature checker 226 then compares the calculated boot signature with the expected boot signature to determine whether or not tampering has occurred.

Figure 3:
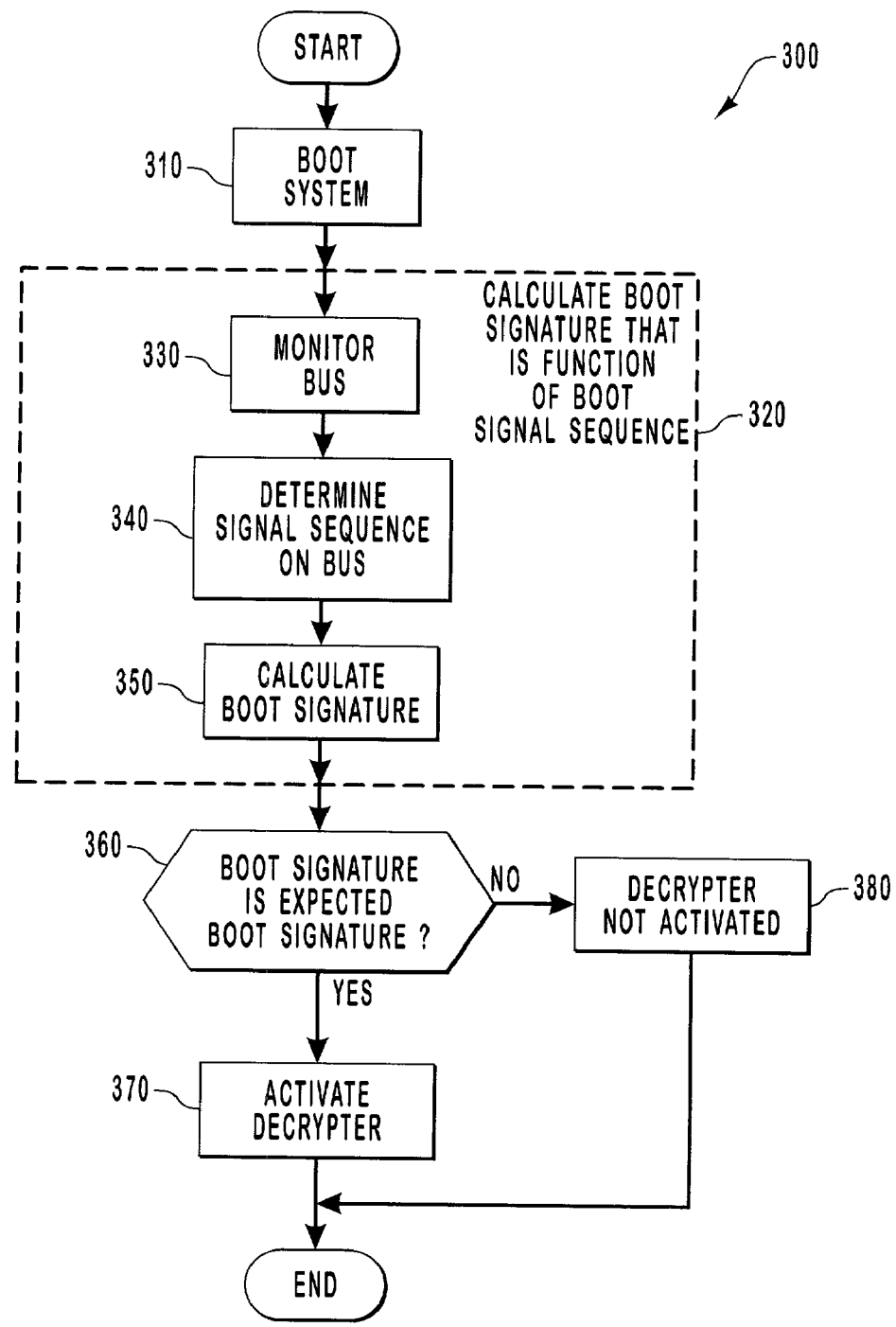
FIG. 3 illustrates a flowchart of a method implemented by the computer system of FIG. 2 for detecting tampering of the computer system of FIG. 2 and acting upon such tampering so as to at least prevent the user from gaining unauthorized access to presentable content.

FIG. 3 illustrates a flowchart of a method 300 of detecting whether tampering of the receiver computer system 130 has occurred and then acting upon such tampering so as to at least prevent the user from gaining access to presentable content. The method 300 will be described with frequent reference to both FIG. 2 and FIG. 3.

The method 300 is initiated in response to the booting up of the receiver computer system (step 310). Typically, the booting up might occur in response to the powering up or resetting of the receiver computer system 130. The method 300 then performs a step for calculating a boot signature that is a function of a signal sequence experienced internal to the computer system during booting of the computer system (step 320).

The signal sequence may occur at any location internal to the receiver computer system 130 so long as the signal sequence would change if the receiver computer system 130 had been tampered with. In the example of FIG. 2 in which the receiver computer system 130 includes a bus 206 connecting the processing device 202 and the memory device 204, the step for calculating a boot signature is performed by the boot signature checker 226 first monitoring the bus 206 between the processing device 202 and the memory device 204 (step 330) to determine the signal sequences experienced on the bus 206. Next, the boot signature checker 226 determines the signal sequence that occurs on the bus 206 during the boot process (step 340). Finally, the boot signature checker 226 calculates the boot signature (step 350), the calculated boot signature being such that different detected signal sequences will in all probability cause a distinctly different calculated boot signature.

Once, the boot signature is calculated, the method 300 performs a step for determining whether the calculated boot signature is indicative of the receiver computer system 130 being tampered with. In the example of FIG. 3, this determination is made by comparing the calculated boot signature with the expected boot signature. Once this determination is made, the method performs a step for acting on the determination of whether the calculated boot signature is indicative of the receiver computer system having been tampered with.

For example, if the boot signature is the expected boot signature ("YES" in decision block 360), then the signal sequence is characteristic of the memory device 204 not having been tampered with. In this case, appropriate action is taken that is consistent with the receiver computer system not having been tampered with. Such action might include, for example, activating a decrypter (step 370). "Activating" a decrypter means that the decrypter will decrypt received content so long as the decrypter has received all other permissions necessary to decrypt. For example, an "activated" decrypter will decrypt content if the associated Entitlement Control Message (ECM) indicates permission to access the content. However, an "activated" decrypter will not decrypt content if the associated ECM indicates that permission to access is denied.

If the calculated boot signature is not the expected boot signature ("NO" in decision block 360), then the signal sequence is characteristic of the memory device 204 having been tamper with so as to, for example, obtain unauthorized access to presentable content. In this case, appropriate action is taken that is consistent with the receiver computer system having been tampered with. For example, the decrypter might be deactivated (step 380) so that the presentable content may not be presented to the unauthorized user. A "deactivated" decrypter means that the decrypter does not decrypt any content at all whether or not the associated ECM grants permission to access. Other action might include, for example, disabling the demodulator so that received presentable content is not demodulated, disabling the tuner so that the presentable content cannot be tuned, disabling the demodulator so that audio and video data cannot be extracted, disabling a CPU clock, disabling a network interface device and so forth. Thus, appropriate action could include disabling some or all of the functionality of the receiver computer system 130.

In a situation where the decrypter is to be enabled only if the calculated boot signature matches the expected boot signature, the step for acting on the determination might include the boot signature checker 226 transmitting the calculated boot signature 232 to the decrypter 214. This transmission may occur over the bus 206. However, in FIG. 1, the boot signature 232 is provided over a dedicated connection 228 with the decrypter 214. If the boot signature checker 226 and the decrypter are within the same physical component, the dedicated connection 228 may also be within the same physical component making it difficult, if not impossible, for an outside user to monitor the dedicated connection 228.

The calculated boot signature 232 itself may be the key string needed to activate the decrypter 214. However, the calculated boot signature 232 may also be used to obtain access to the appropriate activation key word. For example, the decrypter 214 may be configured to access memory such as the memory device 204 to obtain the key string when the decrypter receives the correct boot signature 232. Then, the accessed key string activates the decrypter. Other components may also be used to obtain access to the key word in response to the boot signature checker 226 providing the correct boot signature.

The above-described system and method effectively prevents users from tampering with the receiving computer system as when altering the content of the memory device 204 or swapping out the memory device 204 in order to obtain unauthorized access to presentable content since such altering of the memory device 204 content would cause the signal sequence on the bus at boot time to change.

There may be times, however, when the software stored in the memory device 204 may need to be changed in order to upgrade the software. These upgrades may also affect the signal sequence on the bus 206 during boot time. In these cases, a new expected boot signature is provided to the receiver computer system 130 that matches the boot signal sequence that would be generated with the new updated software installed on the receiver computer system 130. This new boot signature may be provided with the software upgrade or may be accessed from a remote source as needed.

In the example of FIG. 1, new boot signatures are provided over a secured channel 130. The secured channel may be "secured" by being a separate dedicated physical connection, or may be "secured" by using a secured communication protocol. As shown in FIG. 2, the new boot signature corresponding to the newly installed software is transmitted to the boot signature checker 226. The boot signature checker then replaces the expected boot signature 234 with the new expected boot signature. During the next booting operation, an untampered computer system 130 would result in the new expected boot signature being calculated based on the detected boot signal sequence. In FIG. 2, the receiving computer system 130 may be coupled to the secured channel using a network interface device 236.

The above describes a system and method for detecting tampering of a computer system by using a boot signature. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system with a processing device coupled to a memory device through a bus and a boot signature checker that is separate from the processing device, the computer system configured to be capable of receiving presentable content, a method of detecting tampering of the computer system, the method comprising the following:
   a specific act of booting up the computer system;
   a specific act of the boot signature checker monitoring a signal sequence that occurs on the computer system bus coupling the processing device and memory device during the specific act of booting up the computer system;
   a specific act of the boot signature checker calculating a boot signature from the monitored signal sequence;
   a specific act of comparing the calculated boot signature to an expected boot signature that represents no tampering to the computer system; and
   a specific act of determining that tampering has not occurred if the calculated boot signature is the same as the expected boot signature.

2. A method in accordance with claim 1, further comprising the following:
   a specific act of enabling presentable content to be presented if it is determined that tampering has not occurred.

3. A method in accordance with claim 2, wherein the presentable content is encrypted presentable content, wherein the specific act of enabling presentable content to be presented comprises the following:
   activating a decrypter that receives the encrypted presentable content.

4. A method in accordance with claim 3, wherein the specific act of monitoring a signal sequence is performed by a boot signature checker circuit that is integrated with the decrypter.

5. A method in accordance with claim 3, wherein the specific act of activating a decrypter comprises the following:
   a specific act of providing the calculated boot signature directly to the decrypter, wherein the decrypter is configured to accept the expected boot signature as a key string needed to activate the decrypter.

6. A method in accordance with claim 3, wherein the specific act of activating a decrypter comprises the following:
   a specific act of providing the calculated boot signature to the decrypter; and
   a specific act of the decrypter obtaining a key string needed to be activated if the calculated boot signature matched the expected boot signature.

7. A method in accordance with claim 6, wherein the specific act of the decrypter obtain a key string comprises the following:
   a specific act of the decrypter obtaining the key string from the memory device.

8. A method in accordance with claim 1, further comprising the following:
   a specific act of determining that tampering has occurred if the calculated boot signature is different than the expected boot signature.

9. A method in accordance with claim 8, further comprising the following:

a specific act of blocking the presentation of the presentable content if it is determined that tampering has occurred.

10. A method in accordance with claim 9, wherein the specific act of blocking the presentation of the presentable content comprises the following:

a specific act of deactivating a decrypter that receives the presentable content.

11. A method in accordance with claim 9, wherein the specific act of blocking the presentation of the presentable content comprises the following:

a specific act of disabling a demodulator such that the demodulator does not demodulate the presentable content.

12. A method in accordance with claim 9, wherein the specific act of blocking the presentation of the presentable content comprises the following:

a specific act of disabling a tuner such that the tuner does not tune to the presentable content.

13. A method in accordance with claim 9, wherein the specific act of blocking the presentation of the presentable content comprises the following:

disabling a central processing unit clock.

14. A method in accordance with claim 9, wherein the specific act of blocking the presentation of the presentable content comprises the following:

disabling a demultiplexor such that audio, video or other data cannot be extracted from the presentable content.

15. A method in accordance with claim 9, wherein the specific act of blocking the presentation of the presentable content comprises the following:

disabling a network interface device used by the computer system to interface with a network.

16. A method in accordance with claim 1, wherein the specific act of calculating a boot signature that is a function of the signal sequence comprises the following:

calculating the boot signature by applying a polynomial expression to the signal sequence.

17. In a computer system with a processing device coupled to a memory device through a bus and a boot signature checker that is separate from the processing device, the computer system configured to be capable of receiving presentable, a method of detecting tampering of the computer system, the method comprising the following:

a specific act of booting up the computer system;

a step for the boot signature checker producing a boot signature that is a function of a signal sequence experienced on the computer system bus between the processing device and the memory device during the specific act of booting; and a step for determining whether the calculated boot signature is indicative of the computer system being tampered with.

18. A method in accordance with claim 17, wherein the step for calculating a boot signature comprises the following:

a specific act of monitoring the signal sequence during the specific act of booting up the computer system; and a specific act of calculating the boot signature as a function of the signal sequence monitored during the specific act of monitoring.

19. A method in accordance with claim 18, wherein the specific act of monitoring the signal sequence comprising the following:

a specific act of a boot signature checker monitoring the bus to determine the signal sequence that occurs on the bus during the specific act of booting up the computer system.

20. A method in accordance with claim 17, further comprising:

a step for acting on the determination of whether the calculated boot signature is indicative of the computer system being tampered with.

21. A method in accordance with claim 20, wherein the step for acting on the determination comprises the following:

a specific act of activating a decrypter so as to enable the decrypter to decrypt the presentable content.

22. A method in accordance with claim 21, wherein the specific act of activating a decrypter comprises the following:

a specific act of providing the calculated boot signature directly to the decrypter, wherein the decrypter is configured to accept an expected boot signature as a key string needed to activate the decrypter.

23. A computer system capable of receiving presentable content, wherein the computer system comprises:

a processing device;

a memory device;

a local bus coupled to the processing device and the memory device;

a decrypter configured to decrypt encrypted content when activated; and a boot signature checker, separate from the processing device, that is coupled to the local bus so as to be able to read a signal sequence asserted on the local bus during booting of the computer system, wherein the boot signature checker is configured to calculate a boot signature from the signal sequence asserted on the local bus coupling the processing device and the memory device.

24. A computer system in accordance with claim 23, wherein the boot signature checker is directly coupled to the bus.

25. A computer system in accordance with claim 23, wherein the boot signature checker is coupled to the decrypter so as to provide the boot signature to the decrypter.

26. A computer system in accordance with claim 23, wherein the boot signature checker and the decrypter are integrated within a single physical device.

27. A computer system capable of decrypting encrypted content, wherein the computer system comprises:

a processing device;

a memory device;

a bus coupled to the processing device and the memory device;

a decrypter configured to decrypt encrypted content when activated; and means for calculating a boot signature, separate from the processing device, that is a function of the signal sequence experienced on the computer system bus between the processing device and the memory device during booting up of the computer system.

28. A computer system in accordance with claim 27, wherein the means for calculating a boot signature comprises the following:
- a processing device;
- a memory device;
- a bus coupled to the processing device and to the memory device of the means for calculating a boot signature; and
- a boot signature checker that is coupled to the computer system bus so as to be able to monitor the bus for signal sequences.

29. A computer system in accordance with claim 28, further comprising the following:
- a decrypter; and
- a dedicated connection connecting the boot signature checker with the decrypter.

30. A computer system in accordance with claim 28, wherein the boot signature checker, the dedicated connection, and the decrypter are integrated within a single physical device.

* * * * *